United States Patent

Menzak, Jr.

[11] Patent Number: 5,832,818
[45] Date of Patent: Nov. 10, 1998

[54] PLASTIC BOTTLE HEATING ELEMENT COMPRESSOR

[76] Inventor: Joseph Menzak, Jr., 2 Judge Thompson Rd., Somerville, N.J. 08876

[21] Appl. No.: 992,929

[22] Filed: Dec. 17, 1997

[51] Int. Cl.[6] .................. B30B 15/34; B30B 1/04
[52] U.S. Cl. ............... 100/92; 100/99; 100/250; 100/269.01; 100/293; 100/318; 100/320
[58] Field of Search ............... 100/92, 99, 240, 100/245, 250, 252, 269.01, 269.07, 293, 315–320, 902

[56] References Cited

U.S. PATENT DOCUMENTS

| | | | |
|---|---|---|---|
| 2,423,208 | 7/1947 | Storey | 100/293 |
| 2,817,290 | 12/1957 | Parker et al. | 100/902 |
| 2,822,030 | 2/1958 | Pokras | 100/320 |
| 2,904,098 | 9/1959 | Maitzen | 100/320 |
| 3,383,228 | 5/1968 | Rekate et al. | 100/320 |
| 4,475,449 | 10/1984 | Gianelo | 100/902 |
| 4,860,958 | 8/1989 | Yerman | 100/320 |
| 4,898,304 | 2/1990 | Bacon, Jr. | 100/293 |
| 5,448,946 | 9/1995 | Laux | 100/902 |

FOREIGN PATENT DOCUMENTS

| | | | |
|---|---|---|---|
| 2596688 | 10/1987 | France | 100/92 |
| 2668732 | 5/1992 | France | 100/92 |
| 2692190 | 12/1993 | France | 100/92 |
| 2307611 | 8/1974 | Germany | 100/250 |
| 4234894 | 7/1993 | Germany | 100/269.01 |

*Primary Examiner*—Stephen F. Gerrity

[57] ABSTRACT

A plastic bottle heating element compressor for compressing plastic bottles to reduce storage area required for plastic recyclables. The inventive device includes a cylindrical housing having an open upper end, a closed lower end and a cylindrical side wall therebetween. The open upper end has a lid removably secured thereover. A plurality of heating coils are disposed within the cylindrical side wall of the cylindrical housing. A power switch is disposed within the cylindrical side wall of the cylindrical housing upwardly of the closed lower end thereof. The power switch is in communication with the plurality of heating coils. The power switch has an electrical cord extending outwardly therefrom for coupling with a standard electrical outlet. A crushing mechanism is positioned interiorly of the cylindrical side wall of the cylindrical housing.

5 Claims, 3 Drawing Sheets

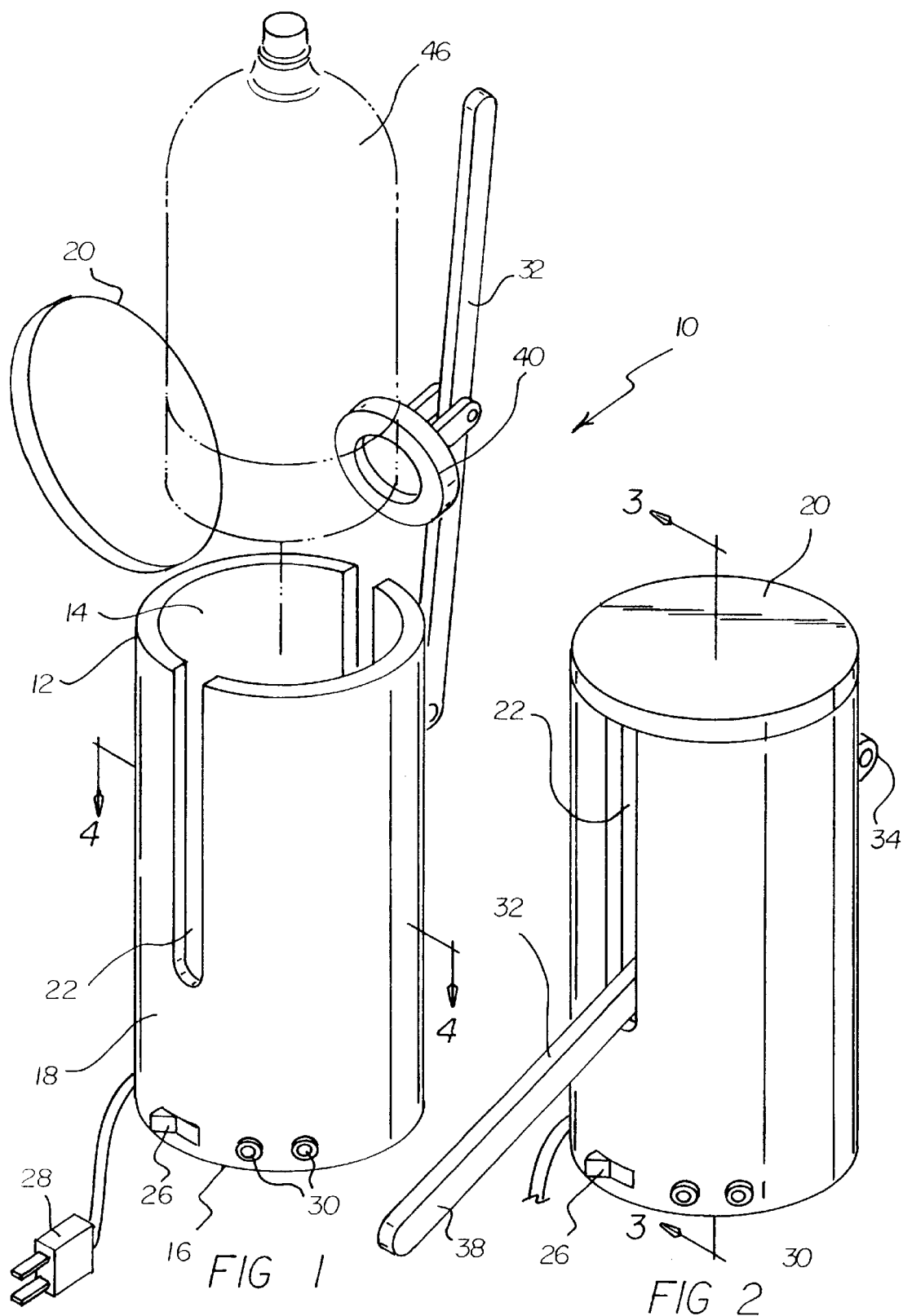

PLASTIC BOTTLE HEATING ELEMENT COMPRESSOR

BACKGROUND OF THE INVENTION

1. Field of the Invention

The present invention relates to bottle and can crushers and more particularly pertains to a new plastic bottle heating element compressor for compressing plastic bottles to reduce storage area required for plastic recyclables.

2. Description of the Prior Art

The use of bottle and can crushers is known in the prior art. More specifically, bottle and can crushers heretofore devised and utilized are known to consist basically of familiar, expected and obvious structural configurations, notwithstanding the myriad of designs encompassed by the crowded prior art which have been developed for the fulfillment of countless objectives and requirements.

Known prior art bottle and can crushers include U.S. Pat. No. 5,265,530 to Perhacs et al.; U.S. Pat. No. 5,125,333 to Gourley, III; U.S. Pat. No. Des. 320,801 to McIntosh; U.S. Pat. No. 4,301,722 to Balbo et al.; U.S. Pat. No. 5,203,262 to Menard et al.; and U.S. Pat. No. 5,029,522 to Brisson.

While these devices fulfill their respective, particular objectives and requirements, the aforementioned patents do not disclose a new plastic bottle heating element compressor. The inventive device includes a cylindrical housing having an open upper end, a closed lower end and a cylindrical side wall therebetween. The open upper end has a lid removably secured thereover. A plurality of heating coils are disposed within the cylindrical side wall of the cylindrical housing. A power switch is disposed within the cylindrical side wall of the cylindrical housing upwardly of the closed lower end thereof. The power switch is in communication with the plurality of heating coils. The power switch has an electrical cord extending outwardly therefrom for coupling with a standard electrical outlet. A crushing mechanism is positioned interiorly of the cylindrical side wall of the cylindrical housing.

In these respects, the plastic bottle heating element compressor according to the present invention substantially departs from the conventional concepts and designs of the prior art, and in so doing provides an apparatus primarily developed for the purpose of compressing plastic bottles to reduce storage area required for plastic recyclables.

SUMMARY OF THE INVENTION

In view of the foregoing disadvantages inherent in the known types of bottle and can crushers now present in the prior art, the present invention provides a new plastic bottle heating element compressor construction wherein the same can be utilized for compressing plastic bottles to reduce storage area required for plastic recyclables.

The general purpose of the present invention, which will be described subsequently in greater detail, is to provide a new plastic bottle heating element compressor apparatus and method which has many of the advantages of the bottle and can crushers mentioned heretofore and many novel features that result in a new plastic bottle heating element compressor which is not anticipated, rendered obvious, suggested, or even implied by any of the prior art bottle and can crushers, either alone or in any combination thereof.

To attain this, the present invention generally comprises a cylindrical housing having an open upper end, a closed lower end and a cylindrical side wall therebetween. The open upper end has a lid removably secured thereover. The housing has a pair of diametrically opposed slots extending downwardly from the open upper end. A plurality of heating coils are disposed within the cylindrical side wall of the cylindrical housing. A power switch is disposed within the cylindrical side wall of the cylindrical housing upwardly of the closed lower end thereof. The power switch is in communication with the plurality of heating coils. The power switch has an electrical cord extending outwardly therefrom for coupling with a standard electrical outlet. A pair of power indicating lights are disposed within the cylindrical side wall of the cylindrical housing. The pair of power indicating lights include a green light to indicate activation of the heating coils and a red light to indicate de-activation of the heating coils. The pair of power indicating lights are in communication with the power switch. A crushing mechanism is positioned interiorly of the cylindrical side wall of the cylindrical housing. The crushing mechanism includes a lever pivotally positioned within the diametrically opposed slots of the housing. The lever has a fixed first end pivotally secured to a tab disposed on the cylindrical side wall adjacent to one of the slots. The lever has a moving second end extending outwardly of one of the opposed slots opposed from the fixed first end. The crushing mechanism further includes a plunger portion secured to the lever within the cylindrical housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new plastic bottle heating element compressor apparatus and method which has many of the advantages of the bottle and can crushers mentioned heretofore and many novel features that result in a new plastic bottle heating element compressor which is not anticipated, rendered obvious, suggested, or even implied by any of the prior art bottle and can crushers, either alone or in any combination thereof.

It is another object of the present invention to provide a new plastic bottle heating element compressor which may be easily and efficiently manufactured and marketed.

It is a further object of the present invention to provide a new plastic bottle heating element compressor which is of a durable and reliable construction.

An even further object of the present invention is to provide a new plastic bottle heating element compressor which is susceptible of a low cost of manufacture with regard to both materials and labor, and which accordingly is then susceptible of low prices of sale to the consuming public, thereby making such plastic bottle heating element compressor economically available to the buying public.

Still yet another object of the present invention is to provide a new plastic bottle heating element compressor which provides in the apparatuses and methods of the prior art some of the advantages thereof, while simultaneously overcoming some of the disadvantages normally associated therewith.

Still another object of the present invention is to provide a new plastic bottle heating element compressor for compressing plastic bottles to reduce storage area required for plastic recyclables.

Yet another object of the present invention is to provide a new plastic bottle heating element compressor which includes a cylindrical housing having an open upper end, a closed lower end and a cylindrical side wall therebetween. The open upper end has a lid removably secured thereover. A plurality of heating coils are disposed within the cylindrical side wall of the cylindrical housing. A power switch is disposed within the cylindrical side wall of the cylindrical housing upwardly of the closed lower end thereof. The power switch is in communication with the plurality of heating coils. The power switch has an electrical cord extending outwardly therefrom for coupling with a standard electrical outlet. A crushing mechanism is positioned interiorly of the cylindrical side wall of the cylindrical housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new plastic bottle heating element compressor according to the present invention.

FIG. 2 is a perspective view of the present invention illustrated in use.

DESCRIPTION OF THE PREFERRED EMBODIMENT

Figure 3:
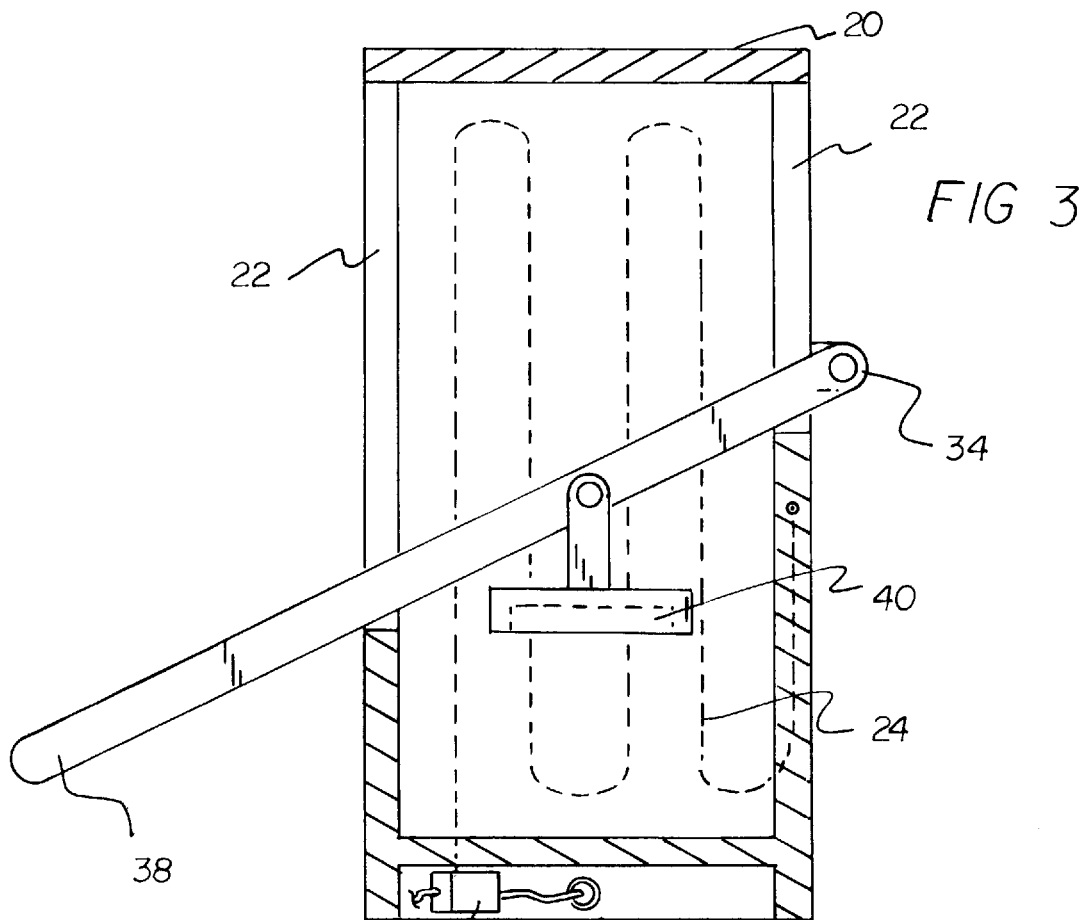
FIG. 3 is a cross-sectional view of the present invention as taken along line 3—3 of FIG. 2.
Figure 4:
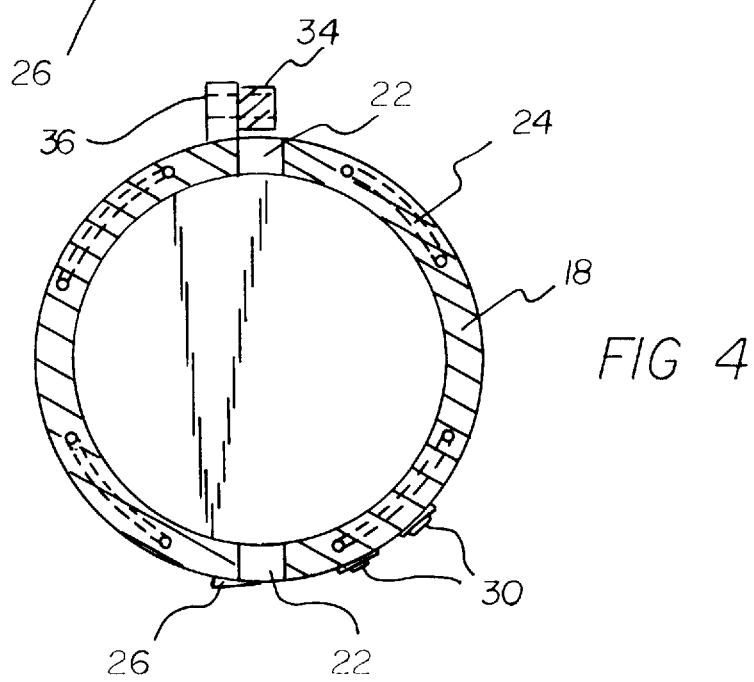
FIG. 4 is a cross-sectional view of the present invention as taken along line 4—4 of FIG. 1.

With reference now to the drawings, and in particular to FIGS. 1 through 5 thereof, a new plastic bottle heating element compressor embodying the principles and concepts of the present invention and generally designated by the reference numeral 10 will be described.

As best illustrated in FIGS. 1 through 5, the plastic bottle heating element compressor 10 comprises a cylindrical housing 12 having an open upper end 14, a closed lower end 16 and a cylindrical side wall 18 therebetween. The open upper end 14 has a lid 20 removably secured thereover. The housing 12 has a pair of diametrically opposed slots 22 extending downwardly from the open upper end 14.

A plurality of heating coils 24 are disposed within the cylindrical side wall 18 of the cylindrical housing 12.

A power switch 26 is disposed within the cylindrical side wall 18 of the cylindrical housing 12 upwardly of the closed lower end 16 thereof. The power switch 26 is in communication with the plurality of heating coils 24. The power switch 26 has an electrical cord 28 extending outwardly therefrom for coupling with a standard electrical outlet.

A pair of power indicating lights 30 are disposed within the cylindrical side wall 18 of the cylindrical housing 12. The pair of power indicating lights 30 include a green light to indicate activation of the heating coils 24 and a red light to indicate de-activation of the heating coils 24. The pair of power indicating lights 30 are in communication with the power switch 26.

A crushing mechanism is positioned interiorly of the cylindrical side wall 18 of the cylindrical housing 12. The crushing mechanism includes a lever 32 pivotally positioned within the diametrically opposed slots 22 of the housing 12. The lever 32 has a fixed first end 34 pivotally secured to a tab 36 disposed on the cylindrical side wall 18 adjacent to one of the slots 22. The lever 32 has a moving second end 38 extending outwardly of one of the opposed slots 22 opposed from the fixed first end 34. The crushing mechanism further includes a plunger portion 40 secured to the lever 32 within the cylindrical housing 12.

Figure 5:
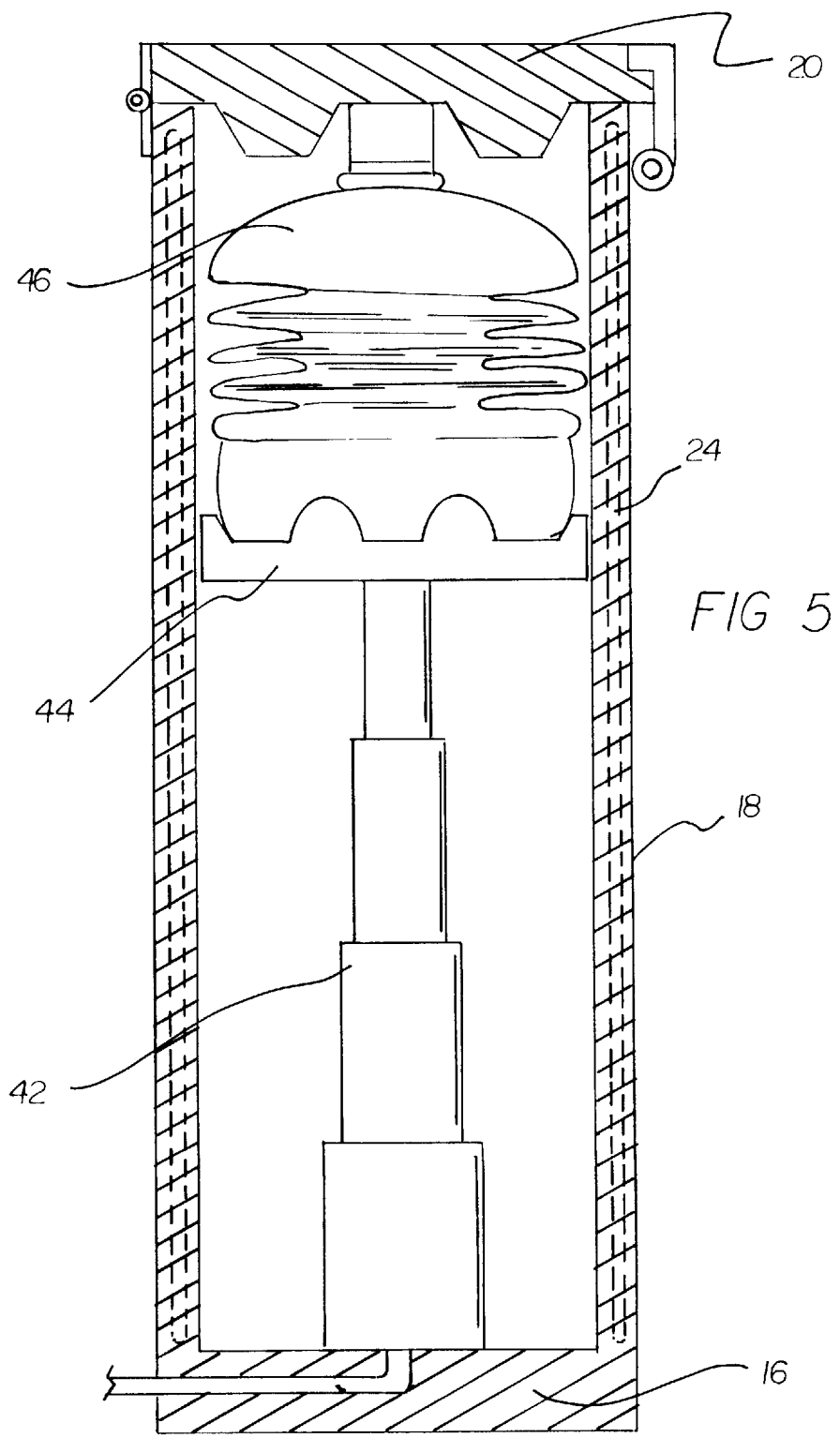
FIG. 5 is a cross-sectional view of a second embodiment of the present invention.

An alternate crushing mechanism is illustrated in FIG. 5. This crushing mechanism includes an automated telescoping arm 42 secured to the closed lower end 16 of the housing 12. A free end of the telescoping arm 42 has a plate 44 disposed thereon for receiving a plastic bottle 46 thereon. The telescoping arm 42 is in communication with the power switch 26.

In use of the preferred embodiment, the lid 20 is removed and a plastic bottle 46 is placed within the cylindrical housing 12 and the power switch 26 is activated. The user then presses down on the moving second end 38 of the lever 32 thereby effecting the downward movement of the plunger portion 40, which along with the heat generated by the heated coils 24, will effect the crushing of the plastic bottle 46. In the alternate embodiment, the plastic bottle 46 is placed on top of the plate 44 and lid 20 is tightly secured with respect to the cylindrical housing 12. The power switch 26 is activated which will activate the heating coils 24 and cause the telescoping arm 42 to extend upwardly towards the lid 20 thereby crushing the plastic bottle 46 against the lid 20. Note FIG. 5.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A plastic bottle heating element compressor for compressing plastic bottles to reduce storage area required for plastic recyclables comprising, in combination:

a cylindrical housing having an open upper end, a closed lower end and a cylindrical side wall therebetween, the open upper end having a lid removably secured thereover, the housing having a pair of diametrically opposed slots extending downwardly from the open upper end;

a plurality of heating coils disposed within the cylindrical side wall of the cylindrical housing;

a power switch disposed within the cylindrical side wall of the cylindrical housing upwardly of the closed lower end thereof, the power switch being in communication with the plurality of heating coils, the power switch having an electrical cord extending outwardly therefrom for coupling with a standard electrical outlet;

a pair of power indicating lights disposed within the cylindrical side wall of the cylindrical housing, the pair of power indicating lights including a green light to indicate activation of the heating coils and a red light to indicate de-activation of the heating coils, the pair of power indicating lights being in communication with the power switch;

a crushing mechanism positioned interiorly of the cylindrical side wall of the cylindrical housing, the crushing mechanism including a lever pivotally positioned within the diametrically opposed slots of the housing, the lever having a fixed first end pivotally secured to a tab disposed on the cylindrical side wall adjacent to one of the slots, the lever having a moving second end extending outwardly of one of the opposed slots opposed from the fixed first end, the crushing mechanism further including a plunger portion secured to the lever within the cylindrical housing.

2. A plastic bottle heating element compressor for compressing plastic bottles to reduce storage area required for plastic recyclables comprising, in combination:

a cylindrical housing having an open upper end, a closed lower end and a cylindrical side wall therebetween, the open upper end having a lid removably secured thereover;

a plurality of heating coils disposed within the cylindrical side wall of the cylindrical housing;

a power switch disposed within the cylindrical side wall of the cylindrical housing upwardly of the closed lower end thereof, the power switch being in communication with the plurality of heating coils, the power switch having an electrical cord extending outwardly therefrom for coupling with a standard electrical outlet;

a crushing mechanism positioned interiorly of the cylindrical side wall of the cylindrical housing.

3. The plastic bottle heating element compressor as set forth in claim 2 wherein the crushing mechanism includes an automated telescoping arm secured to the closed lower end of the housing, a free end of the telescoping arm having a plate disposed thereon for receiving a plastic bottle thereon, the telescoping arm being in communication with the power switch.

4. The plastic bottle heating element compressor as set forth in claim 2 and further including a pair of power indicating lights disposed within the cylindrical side wall of the cylindrical housing, the pair of power indicating lights including a green light to indicate activation of the heating coils and a red light to indicate de-activation of the heating coils, the pair of power indicating lights being in communication with the power switch.

5. The plastic bottle heating element compressor as set forth in claim 2 wherein the crushing mechanism includes a lever pivotally positioned within a pair of diametrically opposed slots in the cylindrical housing, the lever having a fixed first end pivotally secured to a tab disposed on the cylindrical side wall adjacent to one of the slots, the lever having a moving second end extending outwardly of one of the opposed slots opposed from the fixed first end, the crushing mechanism further including a plunger portion secured to the lever within the cylindrical housing.

* * * * *